July 6, 1965  D. F. GREBY  3,192,791
ANTIFRICTION SCREW AND NUT ASSEMBLY
Filed June 7, 1962  3 Sheets-Sheet 1
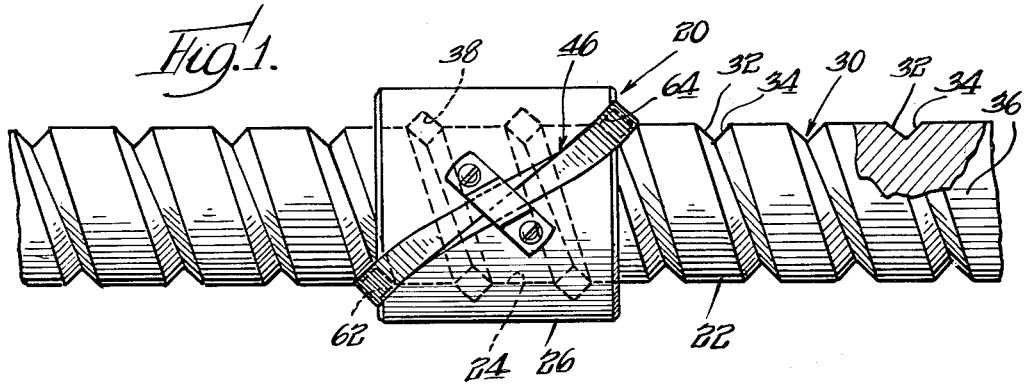
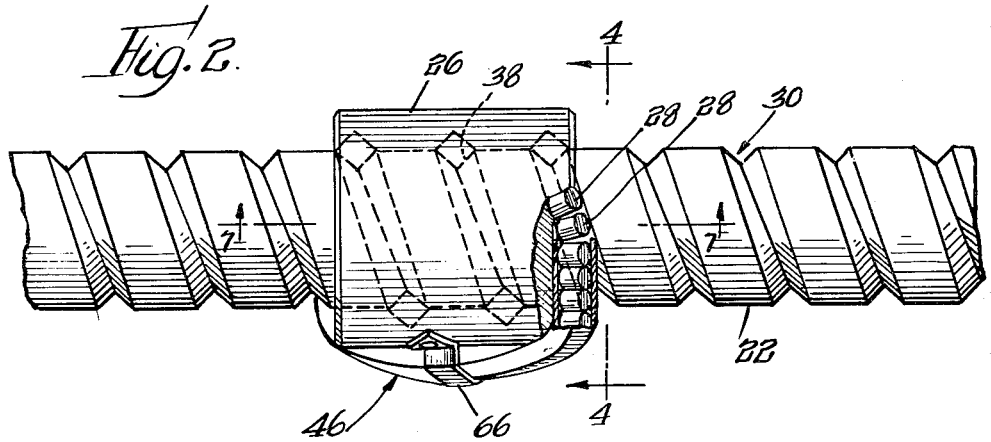
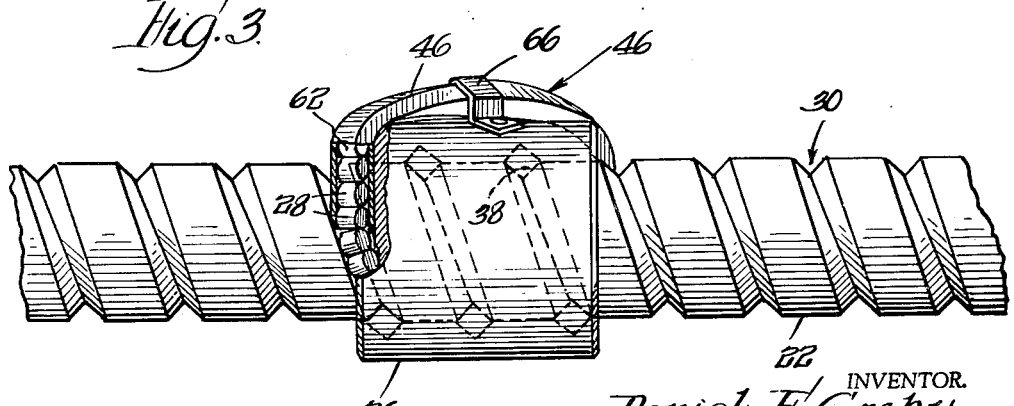
INVENTOR.
Daniel F. Greby
BY
Olson, Trexler, Wolters & Bushnell
attys.

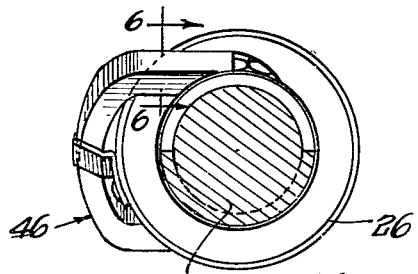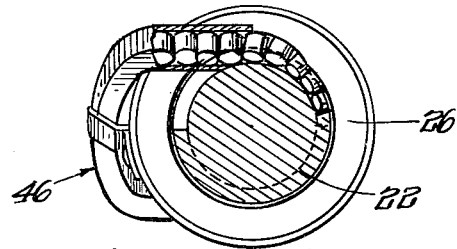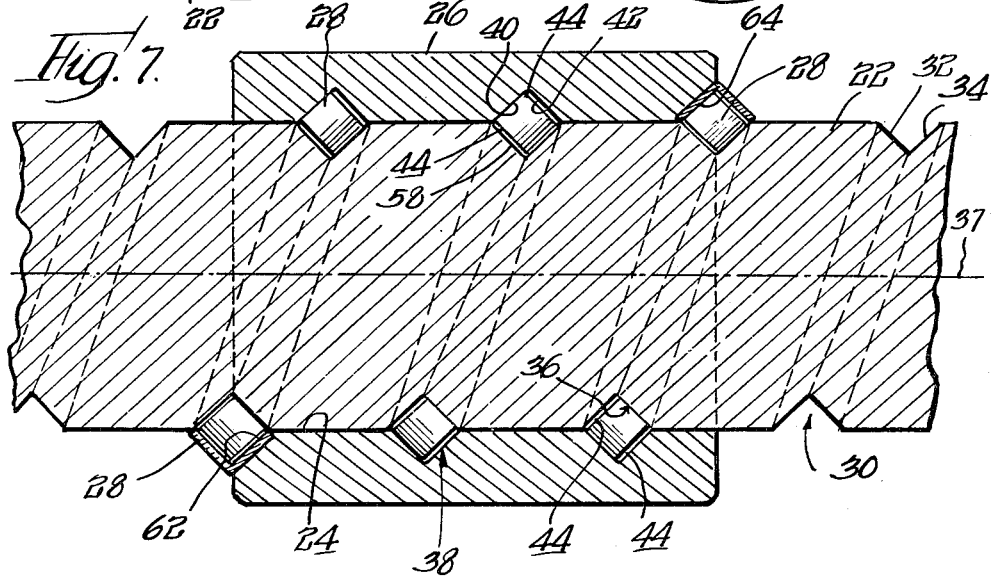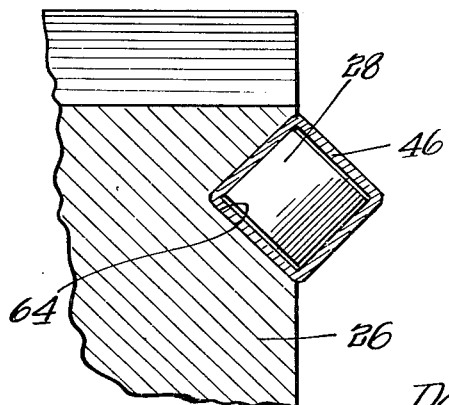

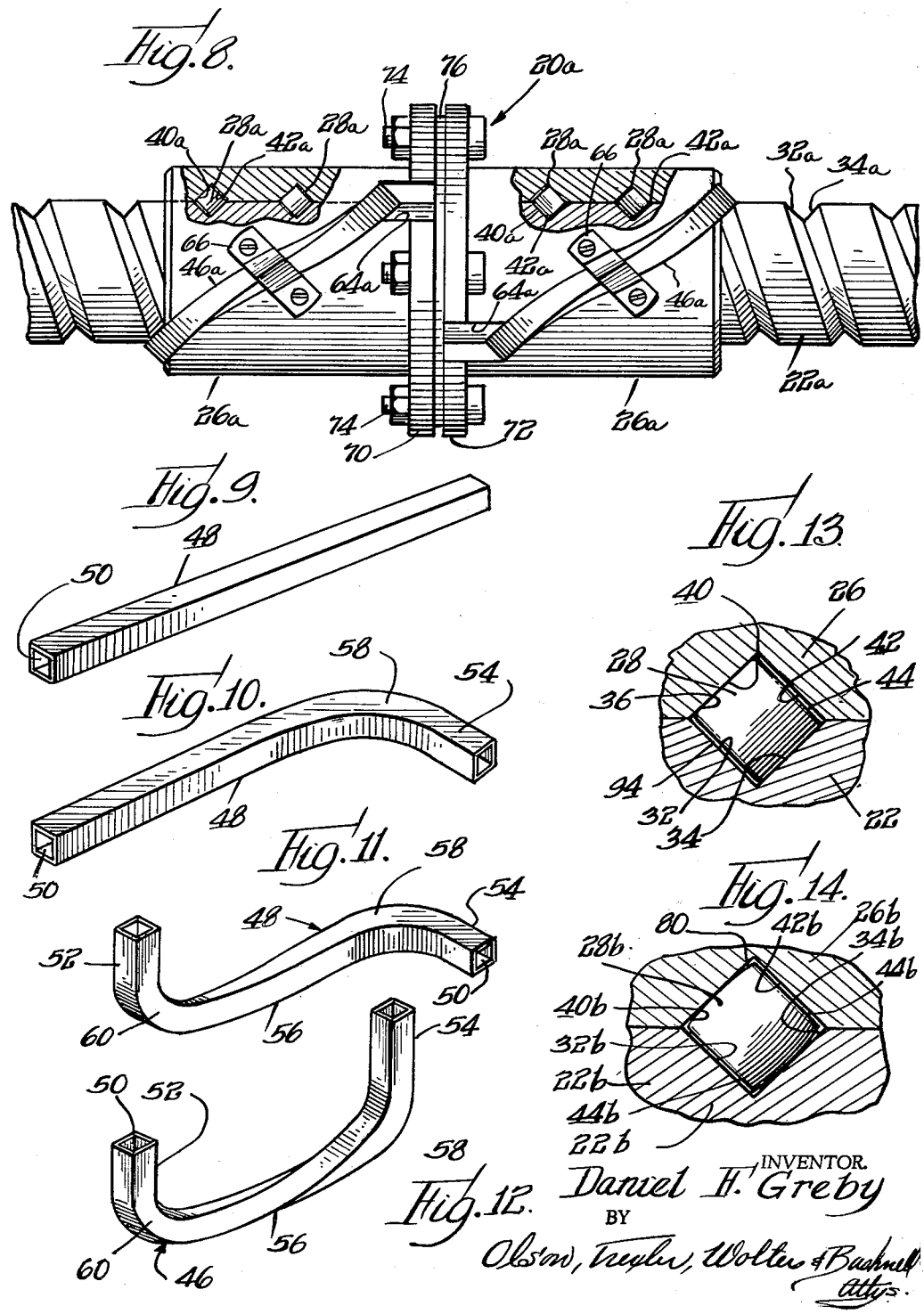

United States Patent Office 3,192,791
Patented July 6, 1965

3,192,791
ANTIFRICTION SCREW AND NUT ASSEMBLY
Daniel F. Greby, Chicago, Ill., assignor, by mesne assignments, to Textron Inc., Providence, R.I., a corporation of Rhode Island
Filed June 7, 1962, Ser. No. 200,719
8 Claims. (Cl. 74—424.8)

The present invention relates to antifriction screw and nut assemblies in which loads are transmitted between a screw and coacting nut means by an endless procession of recirculating antifriction elements.

One object of the invention is to provide an antifriction screw and nut assembly having a new and improved construction which utilizes a recirculating procession of bearing rollers with efficiency and dependability to obtain in the assembly an increased load bearing capability.

Another object is to provide an antifriction screw and nut assembly utilizing a recirculating procession of bearing rollers to obtain a high load bearing capability in the assembly and having a new and improved construction that enables the assembly to operate efficiently and dependably under heavy loads at high operating speeds.

Another object is to provide an antifriction screw and nut assembly having a new and improved construction which utilizes recirculating processions of bearing rollers to provide at once for high operational speeds and the transmission of heavy axial loads in either axial direction between the screw and the nut means.

Another object is to provide an antifriction screw and nut assembly which eliminates axial play between the screw and nut means while at the same time providing for high operational speeds and the transmission of heavy axial loads in either axial direction between the screw and coacting nut means of small size in relation to the axial load sustaining capacity of the assembly.

Another object is to provide antifriction screw and nut assemblies of the character recited in the previous objects having a new and improved construction which is inherently well adapted for economical manufacture and inherently capable of circulating bearing rollers through the assembly with efficiency and dependability at high operating speeds.

Another object is to provide a new and improved method of manufacturing antifriction screw and nut assemblies of the character recited in the preceding objects.

Other objects and advantages will become apparent from the following description of the exemplary embodiments of the invention illustrated in the drawings, in which:

FIGURE 1 is a side view of an antifriction screw and nut assembly forming the first illustrated embodiment of the invention;

FIG. 2 is a plan view of the assembly of FIG. 1 with certain parts sectioned to more clearly reveal the connection between one end of the bearing roller return channel and a helical passage through the nut;

FIG. 3 is a bottom view of the assembly of FIG. 1 with certain parts sectioned to more clearly reveal the connection between the other end of the bearing roller return channel and the helical passage through the nut;

FIG. 4 is an end view taken with reference to the line 4—4 of FIG. 2;

FIG. 5 is a view similar to FIG. 4 with the bearing roller return channel partly broken away to illustrate bearing rollers at the juncture of the channel with one end of the helical passage through the nut;

FIG. 6 is a fragmentary sectional view taken along the line 6—6 of FIG. 4;

FIG. 7 is a longitudinal sectional view taken along the line 7—7 of FIG. 2;

FIG. 8 is a side view of a screw and nut assembly forming a modified embodiment of the invention, certain parts being partially broken away to reveal load bearing antifriction rollers;

FIG. 9 is a perspective view of a length of hollow square stock from which a bearing roller return channel is made;

FIG. 10 is a perspective view illustrating a bearing roller return channel after completion of the first step in fabricating the channel from a length of square stock;

FIG. 11 is a perspective view illustrating the channel after completion of a second step in production of the channel;

FIG. 12 is a perspective view of the channel after completion of a third step in production of the channel;

FIG. 13 is a greatly enlarged sectional view showing a typical bearing roller in load bearing engagement with the coacting screw and nut; and FIG. 14 is a view similar to FIG. 13, but illustrating a typical roller slightly crowned to increase its load bearing capability, the crowning of the roller being greatly exaggerated for clearness in illustration.

Referring to the drawings in greater detail, the antifriction screw and nut assembly 20 forming the first illustrated embodiment of the invention, FIGS. 1 to 7, comprises an elongated screw 22 extending through a central axial bore 24 in a coacting nut 26.

Loads are transmitted between the screw 22 and the nut 26 by means of an endless procession of bearing rollers 28 which minimize rotary friction of the screw and nut relative to each other under load, while at the same time maximizing to great advantage the axial load that can be carried by a screw and nut assembly of a given size. Moreover, provision is made for obtaining in the assembly 20 high operating speed with great efficiency under heavy loads.

The screw 22 is machined to define a helical groove 30, V-shaped in transverse section. The groove 30 is defined by two helical surfaces 32, 34 on the screw 22. As viewed in a longitudinal axial section of the screw 22, FIG. 1, and in FIG. 13 the two helical surfaces 32, 34 defining the groove 30 are straight in transverse section and intersect at the bottom of the groove 30 at a ninety degree angle. Each surface 32, 34 is inclined at an angle of approximately forty-five degrees relative to the axis 37 of the screw 22. The two helical surfaces 32, 34 are equal in width and both make the same angle with reference to a line extending through the intersection of the two surfaces 32, 34 perpendicularly to the axis 37.

The nut 26 defines an internal helical groove 36 which opposes and complements the groove 30 in the screw 22 to define therewith a helical passage 38 extending through the nut 26 and being substantially square in transverse section, as shown in FIG. 7. The helical nut groove 36 is V-shaped in transverse section and is defined by two helical surfaces 40, 42 which are straight as viewed in transverse section. The two surfaces 40, 42 intersect each other at a right angle and are turned at equal angles in relation to a line extending through the intersection of the surfaces 40, 42 in perpendicular relation to the axis 37 of the screw 22, which axis is also the axis of the bore 24 in the nut 26.

The helical passage 38 formed by the nut groove 36 and the screw groove 30 contains a succession of closely adjacent bearing rollers 28 of the endless procession of bearing rollers previously mentioned. In the preferred construction illustrated, successive bearing rollers 28 in the passage 38 have a similar orientation with reference to the passage 38.

Each roller 28 is cylindrical and has rolling contact with one of the two groove defining helical surfaces on the screw 22 and with one of the two groove defining helical surfaces on the nut 26. As shown in FIG. 7, each roller 28 in the passage 38 has rolling contact with the screw groove surface 34 along the full length of the roller and has rolling contact with the nut groove defining surface 40 along the full length of the roller.

A slight clearance 44 is provided between each end of each roller 28 and the adjacent structure by dimensioning the roller so that its length is slightly less than the diameter of the roller. The clearances 44 at opposite ends of each roller obviate binding of the roller at its two ends so that it has free rolling contact with structure defining the passage in which the roller is received. The fact that the rolling engagement of each roller 28 with each of the coacting screw and nut surfaces 34, 40 extends along the full length of the roller enables the roller to sustain a heavy load and transmit a correspondingly large force between the screw 22 and nut 26 without damage to the roller or to either of the helical surfaces 34, 40 on which it rolls.

Rotation of the screw 22 and nut 26 relative to each other causes the rollers 28 to move through the passage 38 between the screw and nut. Rollers 28 discharged from one end of the passage 38 are returned to the other end of the passage 38 by a roller return channel 46 having a construction which makes for economical manufacture of the assembly 20 and which contributes to efficient high speed operational capabilities of the assembly in use.

As illustrated in FIGS. 9 to 12, the roller return channel or tube 46 is fashioned from a length of square tubing stock 48, FIG. 9. The length of square stock 48 defines an internal passage 50 of square shape in transverse section which is slightly larger than the passage 38 extending through the nut 26, FIG. 7.

From the length 48 of tubing stock, a roller return channel 46 of generally U-shape is formed in three steps, as illustrated in FIGS. 10 to 12. The completed return channel 46 has two straight, substantially parallel legs 52, 54 projecting from an intervening connecting portion 56 of the channel.

The first step in forming the channel 46 from a length 48 of tubing consists in bending one end portion of the tube length 48 at ninety degrees in relation to the remaining portion of the tube length 48 to define the leg 54, as illustrated in FIG. 10. The approximately ninety degree bend 58 has somewhat of a "lazy" shape in that the curvature of the bend 58 progressively decreases away from the leg 54, as illustrated in FIG. 10.

The second step consists of bending the opposite end portion of the tubing length 48 to define the second leg 52 which is turned perpendicularly to the first leg 54 and generally perpendicularly to the tube portion intervening between the legs 52 and 54 and designated for convenience by the number 56, as indicated in FIG. 11. The approximately ninety degree bend 60 which connects the leg 52 with the intervening tube segment 56 also has a "lazy" shape, in that its curvature progressively decreases away from the leg 52.

The third step in forming the return channel 46 consists of rotating the two legs 52, 54 into parallel relation to each other so as to form a ninety degree twist in the channel portion 56 intervening between the legs 52, 54, as shown in FIG. 12. Because of the previously described "lazy" shape of the two bends 58, 60, the intervening portion 56 on the channel 46 is bowed somewhat away from the space intervening between the legs 52, 54, so that the channel 46 fits more closely against the generally cylindrical nut 26, as will presently appear.

The two legs 52, 54 of the return channel 46 thus formed are adapted to slide into two parallel channel notches 62, 64 cut into opposite ends of the nut 26. Each notch 62, 64 has a generally V-shape in transverse section, as illustrated in FIG. 6.

The two channel notches 62, 64 are located on opposite sides of the axis 37 of the nut bore 24 and extend inwardly from the periphery of the nut 26 in generally parallel relation to each other and in tangential alined relation to adjacent portions of both the helical screw groove and the helical nut groove 36. Thus, the inner ends of the grooves 62, 64 are substantially alined tangentially with opposite ends of the helical passage 38.

The finished return channel 46 is mounted on the nut 26 so that opposite ends of the passage 50 within the channel 46 register and communicate with opposite ends of the helical passage 38, whereby the channel passage 50 and the helical passage 38 together form an endless passage for the endless procession of bearing rollers 28.

The return channel 46 is mounted on the nut 26 by fitting the channel legs 52, 54 in the nut end grooves 62, 64 and suitably securing the channel in place. As shown in FIGS. 1 to 3, a hold-down strap 66 extending across the central portion of the channel section 56 and secured to the nut 26 serves effectively in conjunction with the grooves 62, 64 in holding the channel in place.

Prior to mounting the channel 46 on the nut 26, the inner ends of the legs 52, 54 are shaped so that upon assembly of the channel on the nut the inner edges of the legs 52, 54 terminate substantially flush with the screw and nut surfaces defining the passage 38, as shown in FIG. 2 through 5.

The endless passage for rollers extending through the nut 26 and through the channel 46 is substantially filled with the endless procession of rollers 28. The roller return channel 46 not only accepts rollers from one end of the helical passage 38 and redelivers the rollers to the other end of the passage 38, but it also performs the necessary function of reorienting these rollers for redelivery to the helical passage.

It will be evident upon inspection of FIG. 7 that the axis of a roller in one end of the helical passage 38 is turned approximately ninety degrees with reference to the axis of a roller in the opposite end of the passage 38. As each roller 28 moves through the channel 46 the axis of the roller is turned through the necessary ninety degree angle in moving through the twisted medial portion 56 of the channel, so that the desired reorientation of the roller is effected. The fact that the channel legs 52, 54 remove rollers from the helical passage 38 and return rollers to the helical passage 38 in directions tangential to the helical passage 38 makes for most efficient and smooth operation of the assembly, which is further enhanced by the progressive reorientation of the rollers in moving through the twisted channel segment 56.

The fact that the successive rollers 28 turn in the same direction because of a similar orientation in the helical passage 38 serves to advantage in making possible a high operating speed capacity for the assembly.

It will be appreciated that the screw 22 and the nut 26 are connected with coacting structure (not shown) in any suitable manner depending upon the character of the environment in which the assembly is used. Moreover, as will be appreciated, suitable connecting structure can be integrally formed on the nut 26.

However, since all of the bearing rollers 28 roll on the helical screw surface 34 and the helical nut surface 40 in the assembly of FIGS. 1 to 7, the assembly is capable of providing its powerful antifriction thrust load sustaining capabilities in only one direction. Having reference to FIG. 7, the rollers 28 provide the powerful, substantially frictionless load sustaining capacity for which the assembly is designed when a thrust load acts on the screw 22 to urge the screw to the left relative to the nut 26. However, a thrust load on the screw 22 tending to urge the screw to the right relative to the nut 26, as viewed in FIG. 7, tends to cause the ends of the rollers 28 to abut against the helical screw surface 32 and the helical nut surface 42. The assembly will sustain this type of axial load, but does not do so in a frictionless manner, as the rollers when subjected to loads in this direction tend to slide on the nut and screw upon rotation of the screw relative to the nut.

Yet, the structure of the screw and nut assembly 20 is well adapted to be used in installations wherein it is necessary to sustain axial thrust loads on the assembly in either axial direction. The modified screw and nut assembly illustrated in FIG. 8 is designed for this service and includes two nuts mounted in tandem on the single screw. Component elements of the assembly shown in FIG. 8 which are similar to those of the assembly 20 just described are identified with the same reference numbers with the addition of the suffix "a."

The two nuts 26a mounted in tandem in the assembly 20a are connected together to operate in unison as a single element and are preferably connected in a manner which eliminates backlash or axial play of the two nuts on the screw 22a.

As shown, flanges 70, 72 formed on adjacent ends of the two nuts 26a are connected together by an annular series of bolts 74 which serve to hold the two nuts 26 against rotation relative to each other, while at the same time providing a means for moving the nuts axially relative to each other to draw the two flanges 70, 72 up against a spacer 76 formed in this instance by a flat annular washer or shim.

The rollers 28a in the two nuts 26a are differently oriented so that the left nut 26a in FIG. 8 is capable of sustaining thrust loads of the screw 22a acting to the left with reference to FIG. 8, and the right-hand nut 26a is capable of sustaining thrust loads of the screw acting to the right with reference to FIG. 8. For this purpose, the rollers 28a in the left nut 26a are turned to roll on the screw surface 34a and on the opposing nut surface 40a. The rollers 28a in the right-hand nut 26a are turned to roll on the screw surface 32a and on the opposing nut surface 42a.

Axial movement of the two nuts 26a by the bolts 74 while the nuts are held against relative rotation preloads the rollers 28a in both nuts so as to eliminate any axial play of the two nuts on the screw 22a. The degree of preloading is determined by a number of physical relationships, including the thickness of the annular shim 78. The preloading can be increased by reducing the thickness of the shim 76, as by removing and grinding down the shim. In the alternative, the annular shim 76 can be replaced by a suitable annular compression spring, such for example as a Belleville spring. Use of a compression spring in place of the shim 76 permits an increase in the preloading of the nuts 26a by simple tightening of the bolts 74. External loads are applied to the assembly 20a by any suitable connecting structure.

As previously recited, the bearing rollers 28 used in the assembly 20 of FIGS. 1 to 7 are cylindrical. A typical roller is illustrated in FIG. 13. Similar cylindrical rollers are used in the assembly 20a of FIG. 8. If exceptionally high axial loads are to be carried, the load carrying capacity of the assembly 20, or the assembly 20a, can be increased by substitution in place of the straight cylindrical bearing rollers, bearing rollers which are slightly crowned. Slightly crowned rollers are illustrated in FIG. 14 in which components similar to those appearing in FIG. 13 are identified with the same reference numbers with the addition of the suffix "b." The crowning of the rollers 28b illustrated in FIG. 14 is greatly exaggerated in the drawings for the purpose of illustration. The rolling surface 80 of each roller 28b has a convex curvature, as viewed from one side of the roller, this curvature or "crown" having a radius of the order of twenty to thirty feet.

It will be appreciated that the invention is not necessarily limited to use of the particular construction illustrated, but includes alternatives and equivalents within the scope of the invention as defined by the claims.

The invention is claimed as follows:

1. An antifriction nut and screw assembly, comprising, in combination, an elongated screw defining a helical groove therein, a nut defining a central axial bore receiving said screw, said nut defining an internal helical groove confronting said helical screw groove to define therewith a first passage of helical shape extending through said nut and being generally square in transverse section, opposite ends of said nut defining two substantially parallel end grooves extending inwardly in the same direction in generally tangential relation to adjacent portions of said nut groove, a bearing roller return channel of generally U-shape including two parallel leg portions extending from an intervening connecting portion of the channel, said channel defining a second passage of generally U-shape extending through the channel and being substantially square in transverse section, said connecting portion of the channel having an approximately ninety degree twist therein forming a similar twist in the corresponding portion of said second passage, said channel being mounted on said nut with the two leg portions of the channel positioned in said respective end grooves of the nut to connect opposite ends of said second passage with said first passage so that the first and second passages together form an endless passage, and an endless procession of generally cylindrical bearing rollers disposed in said endless passage to circulate therethrough upon relative rotation of said nut and screw and to transmit forces between said screw and nut through rolling engagement with the screw and nut.

2. An antifriction screw and nut assembly comprising, in combination; an elongated screw having a helical groove defined by two helical side surfaces which, as viewed in transverse section, are substantially straight, mutually perpendicular, and disposed at substantially equal angles in relation to lines extending through the respective surfaces perpendicularly to the axis of the screw; a nut receiving said screw and defining therein a helical groove complementing the adjacent portion of said screw groove to define therewith a first passage of helical shape extending through said nut; said nut groove being defined by two helical side surfaces which, as viewed in transverse section, are substantially parallel to the opposing ones of said helical side surfaces on the screw so that said first passage is substantially square in transverse section; opposite ends of said nut defining two V-shaped grooves extending inwardly in the same direction in parallel relation to each other and in generally tangential relation to adjacent portions of said screw groove, a bearing roller return channel of generally U-shape including two leg portions extending from an intervening connecting portion of the channel, said channel defining a second passage extending through the channel between opposite ends thereof and being substantially square in transverse section, said connecting portion of the channel having a substantially ninety degree twist therein forming a similar twist in the corresponding portion of said second passage, said channel being mounted on said nut so that the two leg portions of the channel nest in said respective end grooves of the nut and effect connections between opposite ends of said second passage and said first passage so that the first and second passages together form an endless passage, an endless procession of generally cylindrical bearing rollers disposed in said endless passage to circulate therethrough upon rotation of said screw and nut relative to each other, the rollers in said first passage having rolling engagement with a common helical side surface of said screw and with an opposing helical side surface of said nut, and said rollers each having a length slightly less than the diameter of the roller.

3. An antifriction screw and nut assembly comprising, in combination, an elongated screw defining therein a helical groove V-shaped in transverse section, a nut receiving said screw and defining therein a helical groove V-shaped in transverse section and complementing the adjacent portion of said screw groove to define therewith a first passage of helical shape, a bearing roller return channel of generally U-shape including two leg portions extending from an intervening connecting portion of the channel, said channel defining a second passage which extends through the channel between opposite ends thereof and which has a rectilinear shape in transverse section, said connecting portion of the channel having a substantial twist therein forming the same twist in the corresponding portion of said second passage, said channel being mounted on said nut so that the two leg portions of the channel are substantially tangential to adjacent portions of said first passage and connect opposite ends of said second passage with said first passage whereby the first and second passages together form an endless passage, and an endless procession of generally cylindrical bearing rollers disposed in said endless passage for circulation through said first passage in rolling engagement with both said screw and said nut.

4. An antifriction screw and nut assembly comprising, in combination, an elongated screw having a helical groove defined by two helical groove surfaces which are substantially straight as viewed in transverse section, two nuts receiving said screw and being disposed in tandem relation to each other, each of said nuts defining therein an internal helical groove complementing the adjacent portion of said screw groove to define therewith a helical passage having a rectilinear shape in transverse section, means on each nut defining a bearing roller return passage having a rectilinear shape in transverse section and being connected at opposite ends with the helical passage in the nut to form therewith an endless passage, an endless procession of bearing rollers disposed in each endless passage to circulate through said helical passage within the corresponding nut in rolling engagement with the screw and nut, the rollers in said endless passages being oriented so that the rollers in the helical passage in one nut rollingly engage only one of said helical screw groove surfaces and the rollers in the helical passage for the other nut rollingly engage only the other of said helical screw groove surfaces, and means connecting said nuts to displace the two nuts relative to each other to effect preloading of the bearing rollers engaging the screw within each of the nuts.

5. An antifriction screw and nut assembly comprising, in combination; an elongated screw having a helical groove defined by two helical groove surfaces which, as viewed in transverse section, are substantially straight, mutually perpendicular, and substantially equal in width; two nuts receiving said screw and being disposed in tandem relation to each other, each of said nuts defining therein a helical groove complementing the adjacent portion of said screw groove to define therewith a helical first passage extending within the nut along the axis of the screw and being substantially square in transverse section; the groove in each nut being defined by two helical groove surfaces on the nut which, as viewed in transverse section, are substantially straight, mutually perpendicular, substantially equal in width to each other and to the width of the opposed screw groove surfaces, and substantially parallel to the respective screw groove surfaces; two bearing roller return channels for said respective nuts, each return channel including two channel leg portions extending from an intervening connecting portion of the channel, each channel defining for the corresponding nut a substantially square second passage extending through the channel between opposite ends thereof, said connecting portion of each channel having a substantially ninety degree twist forming a similar twist in the corresponding portion of the passage within the channel, each channel being mounted on its corresponding nut so that the two leg portions of the channel are substantially tangential to adjacent portions of said first passage for the nut and connect said second passage formed within the channel for the nut with said first channel for the nut so that the first and second passages together form an endless passage for the nut, an endless procession of generally cylindrical bearing rollers disposed in said endless passage for each nut to circulate through said first passage for the nut in rolling engagement with opposing groove surfaces on the screw and nut, successive bearing rollers in said endless passage for each nut having a similar orientation in the endless passage to have rolling engagement with only one of said helical screw groove surfaces and one of said helical groove surfaces in the corresponding nut, the rollers in said endless passages for the two nuts being oriented differently so that the rollers in the endless passage for one nut rollingly engage one of said helical screw groove surfaces and the rollers in the endless passage for the other nut rollingly engage the other of said helical screw groove surfaces, and connecting means connecting said nuts to displace the two nuts relative to each other to effect preloading of the bearing rollers engaging the screw within each of the nuts.

6. An antifriction screw and nut assembly comprising, in combination; an elongated screw having a helical groove defined by two helical side surfaces which, as viewed in transverse section, are substantially straight, mutually perpendicular, and substantially equal in width; nut means receiving said screw, said nut means defining therein two helical grooves V-shaped in transverse section and complementing adjacent portions of said screw groove to define therewith two helical passages extending within the nut along the axis of the screw and being substantially square in transverse section; said nut means including means defining two bearing roller return passages corresponding to said respective helical passages, each return passage being connected at its opposite ends with the corresponding helical passage to form therewith an endless passage, an endless procession of bearing rollers disposed in each endless passage to circulate through said helical passage portion thereof in rolling engagement with said screw and said nut means, and the rollers in said endless passages being oriented so that the rollers in one of said helical passages rollingly engage only one of said helical screw groove surfaces and the rollers in the other helical passage rollingly engage only the other of said helical screw groove surfaces.

7. The method of making a roller bearing screw and nut assembly comprising, providing an elongated screw blank, machining said blank to form therein a helical groove V-shaped in transverse section, providing a nut blank having a central bore therethrough, machining said nut blank to define therein an internal helical groove V-shaped in transverse section to complement the screw groove, forming V-shaped notches in opposite ends of the nut blank to register generally tangentially with opposite ends of the groove in the nut blank, providing a length of hollow tubing square shaped in transverse section, forming a first bend in the tubing length which turns one end portion of the tubing length at a substantially right angle to the other end portion of the tubing length, forming a second bend in the tubing length to turn said other end portion of the tubing at a substantially right angle to said one end portion and at a substantially right angle to the portion of said tubing length intervening between said end portions thereof, twisting the intervening portion of the tubing length to bring said end portions thereof into generally parallel relation to each other; and placing the screw in the nut, filling the tubing length and the nut groove with bearing rollers, and mounting the tubing length on the nut so that the two end portions of the tubing length seat in said respective end notches in the nut and extend to opposite ends of the nut groove whereby the rollers provide at once for the transmission of thrust between the screw and the nut and for free rotation of the screw and nut in relation to each other and the tubing length together with the nut groove and the opposing portion of the screw groove define an endless passage through which the bearing rollers circulate as an incident to rotation of the nut and screw in relation to each other.

8. The method of making a roller bearing screw and nut assembly comprising, providing a screw defining a helical groove V-shaped in transverse section, providing a nut defining therein an internal helical groove shaped to complement the screw groove, providing a length of hollow tubing square shaped in transverse section, forming a first bend in the tubing length which turns one end portion of the tubing length at a substantially right angle to the other end portion of the tubing length, forming a second bend in the tubing length to turn said other end portion of the tubing at a substantially right angle to said one end portion and at a substantially right angle to the portion of said tubing length intervening between said end portions thereof, twisting the intervening portion of the tubing length to bring said end portions thereof into generally parallel relation to each other; and placing the screw in the nut, filling the tubing length and the nut groove with bearing rollers, and mounting the tubing length on the nut so that the two ends of the tubing length connect with opposite ends of the nut groove so that the tubing length together with the nut groove and the opposing portion of the screw groove define an endless passage through which the bearing rollers circulate as an incident to rotation of the nut and screw in relation to each other.

References Cited by the Examiner

UNITED STATES PATENTS

| 1,717,817 | 6/29 | Sykes | 29—434 |
| 2,616,162 | 11/52 | Sundt | 29—434 |
| 2,664,325 | 12/53 | Bergstrom | 308—215 |
| 2,938,400 | 5/60 | Gondek | 74—424.8 |
| 3,055,230 | 9/62 | Strassberg | 74—424.8 |

OTHER REFERENCES

Publication: Ball Bearing Screw and Spline Operation; Saginaw Steering Gear Div., General Motors Corp., June 8, 1960, p. 16.

DON A. WAITE, *Primary Examiner.*